(12) United States Patent
Miyamoto et al.

(10) Patent No.: US 12,071,187 B2
(45) Date of Patent: Aug. 27, 2024

(54) SPHERICAL BODY DRIVE TYPE MOVEMENT DEVICE

(71) Applicant: Kyushu Institute of Technology, Kitakyushu (JP)

(72) Inventors: Hiroyuki Miyamoto, Kitakyushu (JP); Yoshiki Matsumoto, Kitakyushu (JP)

(73) Assignee: KYUSHU INSTITUTE OF TECHNOLOGY, Kitakyushu (JP)

(*) Notice: Subject to any disclaimer, the term of this patent is extended or adjusted under 35 U.S.C. 154(b) by 639 days.

(21) Appl. No.: 17/293,588

(22) PCT Filed: Nov. 7, 2019

(86) PCT No.: PCT/JP2019/043715
§ 371 (c)(1),
(2) Date: May 13, 2021

(87) PCT Pub. No.: WO2020/110651
PCT Pub. Date: Jun. 4, 2020

(65) Prior Publication Data
US 2022/0009571 A1  Jan. 13, 2022

(30) Foreign Application Priority Data

Nov. 28, 2018 (JP) ................................. 2018-222165
Jul. 16, 2019 (JP) ................................. 2019-131032

(51) Int. Cl.
*B62D 61/06* (2006.01)
*B60B 19/14* (2006.01)
(Continued)

(52) U.S. Cl.
CPC .............. *B62D 61/06* (2013.01); *B60B 19/14* (2013.01); *B60B 33/08* (2013.01); *B62D 11/00* (2013.01)

(58) Field of Classification Search
CPC ....... B60B 19/003; B60B 19/14; B60B 33/08; B62B 61/06
(Continued)

(56) References Cited

U.S. PATENT DOCUMENTS 9,795,863 B1  10/2017  Linder
2010/0243342 A1  9/2010  Wu et al.
(Continued)

FOREIGN PATENT DOCUMENTS

CN          1435330 A    8/2003
CN       201257874 Y    6/2009
(Continued)

OTHER PUBLICATIONS

Office Action dated Jul. 5, 2022, issued in counterpart CN application No. CN201980062115.4, with Search Report and English Translation. (12 pages).

(Continued)

*Primary Examiner* — Minnah L Seoh
*Assistant Examiner* — Christopher B Wehrly
(74) *Attorney, Agent, or Firm* — WHDA, LLP (57) ABSTRACT

A spherical body drive type movement device 10 includes rotary bodies 14, 15, and 16 rotating n number of driving spherical bodies 11, 12, and 13 by being rotationally driven in a state of being in contact from two different directions with each of the driving spherical bodies 11, 12, and 13, and moves on a traveling surface G. The rotary bodies 14, 15, and 16 come into contact with the driving spherical bodies 11, 12, and 13 at positions higher than centers P1, P2, and P3 of the driving spherical bodies 11, 12, and 13 in contact and inside a virtual inverted n-gonal pyramid H or, at positions higher than the centers P1, P2, and P3 of the (Continued)

driving spherical bodies 11, 12, and 13 in contact and on lateral faces α, β, and γ of the virtual inverted n-gonal pyramid H.

10 Claims, 6 Drawing Sheets

(51) Int. Cl.
    *B60B 33/08*    (2006.01)
    *B62D 11/00*    (2006.01)
(58) Field of Classification Search
    USPC .......................................................... 180/6.2
    See application file for complete search history.

(56)                References Cited

U.S. PATENT DOCUMENTS

2011/0263377 A1    10/2011    Wu et al.
2019/0144036 A1*   5/2019     Geiger .................. B62D 15/00
                                                            180/6.5

FOREIGN PATENT DOCUMENTS

| | | |
|---|---|---|
| CN | 107139646 A | 9/2017 |
| JP | H06-090980 A | 4/1994 |
| JP | 2001-063645 A | 3/2001 |
| JP | 2002-200991 A | 7/2002 |
| JP | 2008-006882 A | 1/2008 |
| JP | 2009-234524 A | 10/2009 |
| JP | 2010-30360 A | 2/2010 |
| JP | 2011-063246 A | 3/2011 |
| JP | 2015-24160 A | 2/2015 |
| JP | 2015-117011 A | 6/2015 |
| KR | 100317911 B1 | 12/2001 |

OTHER PUBLICATIONS

International Search Report dated Dec. 24, 2019, issued in counterpart application No. PCT/JP2019/043715 (2 pages).
Office Action dated Sep. 26, 2023, issued in counterpart DE Application No. 112019005925.4, with English translation. (13 pages).

* cited by examiner

SPHERICAL BODY DRIVE TYPE MOVEMENT DEVICE

TECHNICAL FIELD

The present invention is related to a spherical body drive type movement device capable of moving in every direction by rotationally driving spherical bodies.

BACKGROUND ART

Since a movement device having three spherical bodies and three driving means (i.e. driving motors) for providing rotational force to the spherical bodies (refer to patent literature 1) is capable of moving in every direction, it is effective to use such a movement device for an electric wheelchair, a self-propelled carriage, or the like. In the movement device of patent literature 1, two rotors each rotationally driven due to driving of one of the driving means come into contact from different directions with each spherical body. In this movement device, the rotors and the spherical bodies come into contact at positions of a height identical to the centers of the spherical bodies, and idlers (i.e. wheel-shape casters) for pushing the spherical bodies to the rotors are provided. If the rotors idly rotate, the movement device becomes unable to move toward the desired direction. Therefore, it is important to maintain the state where the rotors are pushed to the spherical bodies for the movement device to stably travel.

CITATION LIST

Patent Literature

Patent Literature 1: Japanese Unexamined Patent Application Publication No. 2010-30360

SUMMARY OF INVENTION

Technical Problem

Nevertheless, in the movement device of patent literature 1, the rotors happen to become out of contact with the spherical bodies in rare cases. When the movement device is operated by a user as in a case where the movement device is used for, e.g., an electric wheelchair, it is easy for the user to correct the moving direction by themself. However, in a system without an operator of the movement device as in a case where the movement device is used for, e.g., a self-propelled carriage, there arises a problem that the moving direction cannot be corrected and the movement device fails to travel according to a plan.

As a method for suppressing such idle rotation of the rotors, making the rotors have a multi-layer structure composed of materials having different elastic forces is conceivable. In this case, however, another problem arises that the durability of the rotors decreases and wear of the rotors becomes more intense.

The present invention has been made in consideration of the above circumstances, and has as its object to provide a spherical body drive type movement device capable of suppressing the idle rotation of rotary bodies that are rotationally driven in a state of being in contact with spherical bodies.

Solution to Problem

In order to achieve the above object, according to a first aspect of the present invention, there is provided a spherical body drive type movement device including:

n number of driving spherical bodies each rolling on a traveling surface; and n or more number of rotary bodies rotating the driving spherical bodies by being rotationally driven in a state of being in contact from two different directions with each of the driving spherical bodies, the spherical body drive type movement device moving on the traveling surface, wherein when the traveling surface is a horizontal surface, a center of each of the driving spherical bodies is located on one of lateral edges of a virtual inverted n-gonal pyramid having a base face disposed at a position higher than the center of each of the driving spherical bodies and also having a vertex being away from the base face and disposed at a position lower than the center of each of the driving spherical bodies, further wherein each of the rotary bodies comes into contact with at least one of the driving spherical bodies at a position or positions higher than the center of the at least one of the driving spherical bodies in contact and inside the virtual inverted n-gonal pyramid, or at a position or positions higher than the center of the at least one of the driving spherical bodies in contact and when lateral faces of the virtual inverted n-gonal pyramid each including as a part of an outer edge thereof two of the lateral edges on each of which the center of one of the driving spherical bodies is disposed are defined as corresponding lateral faces, on one of the corresponding lateral faces, and besides, each of the rotary bodies is rotationally driven about a rotary shaft perpendicular to the one of the corresponding lateral faces;

provided, however, that n is an integer of three or more.

In order to achieve the above object, according to a second aspect of the present invention, there is provided a spherical body drive type movement device including:

two driving spherical bodies each rolling on a traveling surface;

a driven rotator rolling on the traveling surface; and m number of rotary bodies rotating the driving spherical bodies by being rotationally driven in a state of being in contact from two different directions with each of the driving spherical bodies, the spherical body drive type movement device moving on the traveling surface, wherein each of the rotary bodies comes into contact with at least one of the driving spherical bodies at a position or positions higher than a center of the at least one of the driving spherical bodies in contact, further wherein one of the m number of rotary bodies in contact with both of the two driving spherical bodies comes into contact with the driving spherical bodies at positions on the driven rotator side with reference to a virtual inclined plane passing the center of each of the driving spherical bodies or at positions on the virtual inclined plane, and besides, the one of the rotary bodies in contact with both of the two driving spherical bodies is rotationally driven about a rotary shaft perpendicular to the virtual inclined plane;

provided, however, that m is an integer of three or more.

In order to achieve the above object, according to a third aspect of the present invention, there is provided a spherical body drive type movement device including:

two driving spherical bodies each rolling on a traveling surface;

a driven rotator rolling on the traveling surface; and r number of rotary bodies rotating the driving spherical bodies by being rotationally driven in a state of being in contact from two different directions with each of the driving spherical bodies, the spherical body drive type movement device moving on the traveling surface, wherein each of the rotary bodies comes into contact with at least one of the driving spherical bodies at a position or positions higher than a center of the at least one of the driving spherical bodies in contact, further wherein two of the r number of rotary bodies receiving driving rotational force from a common motor respectively come into contact with the driving spherical bodies at positions on the driven rotator side with reference to a virtual inclined plane passing the center of each of the driving spherical bodies, or at positions on the virtual inclined plane, and besides, the two of the rotary bodies are each rotationally driven about a rotary shaft perpendicular to the virtual inclined plane; provided, however, that r is an integer of three or more.

Advantageous Effects of Invention

In the spherical body drive type movement device according to the first aspect of the present invention, when the traveling surface on which the n number of driving spherical bodies roll is a horizontal surface, each rotary body comes into contact with the at least one of the driving spherical bodies at a position or positions higher than the center of the at least one of the driving spherical bodies in contact and inside the virtual inverted n-gonal pyramid, or at a position or positions higher than the center of the at least one of the driving spherical body in contact and on one of the corresponding lateral faces, which are the lateral faces of the virtual inverted n-gonal pyramid each including as a part of its outer edge two of the lateral edges on each of which the center of one of the driving spherical bodies is disposed, and besides, each rotary body is rotationally driven about the rotary shaft perpendicular to one of the corresponding lateral faces. The spherical body drive type movement device according to the second aspect of the present invention includes the two driving spherical bodies and the driven rotator rolling on the traveling surface, and out of the m number of rotary bodies each being in contact with the at least one of the driving spherical bodies at a position or positions higher than the center of the at least one of the driving spherical bodies in contact, the one of the rotary bodies in contact with both of the two driving spherical bodies comes into contact with the driving spherical bodies at positions on the driven rotator side with reference to the virtual inclined plane passing the center of each of the driving spherical bodies or at positions on the virtual inclined plane, and besides, the one of the rotary bodies in contact with both of the two driving spherical bodies is rotationally driven about the rotary shaft perpendicular to the virtual inclined plane. The spherical body drive type movement device according to the third aspect of the present invention includes the two driving spherical bodies and the driven rotator rolling on the traveling surface. Out of the r number of rotary bodies each being in contact with the at least one of the driving spherical bodies at a position or positions higher than the center of the at least one of the driving spherical bodies in contact, the two of the rotary bodies receiving the driving rotational force from the common motor respectively come into contact with the driving spherical bodies at positions on the driven rotator side with reference to the virtual inclined plane passing the center of each driving spherical body or at positions on the virtual inclined plane, and besides, the two of the rotary bodies are each rotationally driven about the rotary shaft perpendicular to the virtual inclined plane.

Accordingly, in the spherical body drive type movement device according to each of the first, second, and third aspects of the present invention, the weight of the spherical body drive type movement device itself and the object loaded onto the spherical body drive type movement device is put on the driving spherical bodies while being partially transmitted via the rotary bodies, and thus, the rotary bodies are reliably pushed to the driving spherical bodies. Therefore, the spherical body drive type movement device is capable of suppressing the idle rotation of the rotary bodies rotationally driven in a state of being in contact with the driving spherical bodies.

DESCRIPTION OF EMBODIMENT

The embodiments of the present invention will be subsequently described with reference to the accompanying figures to provide an understanding of the present invention.

Figure 1:
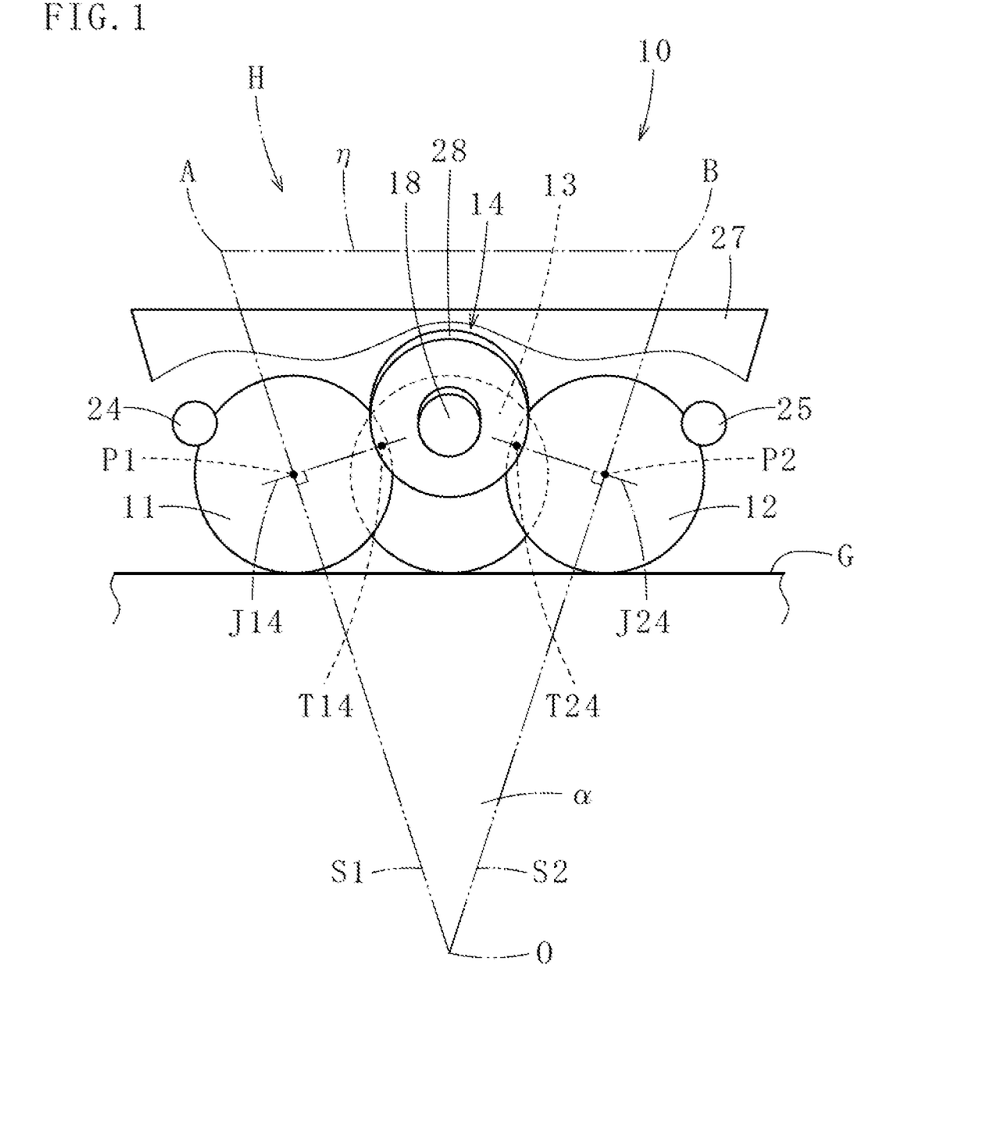
FIG. 1 is an explanatory diagram of a spherical body drive type movement device according to a first embodiment of the present invention.
Figure 2:
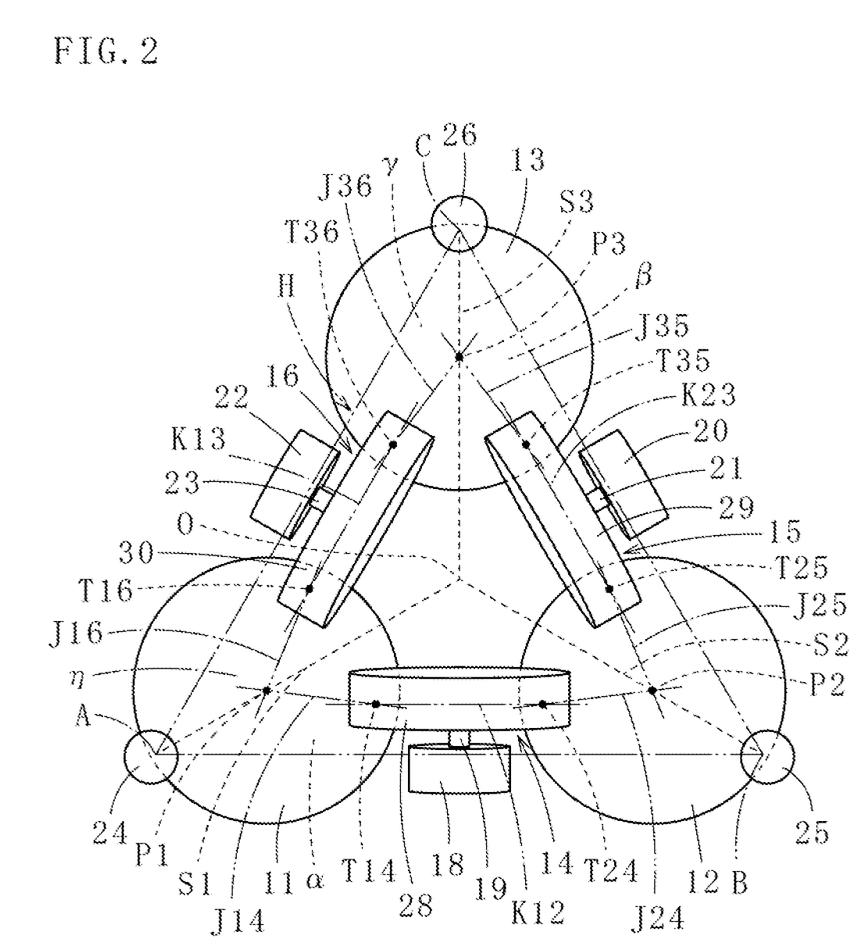
FIG. 2 is a plan view illustrating the arrangement of the driving spherical bodies and the rotary bodies of the same spherical body drive type movement device.
Figure 3:
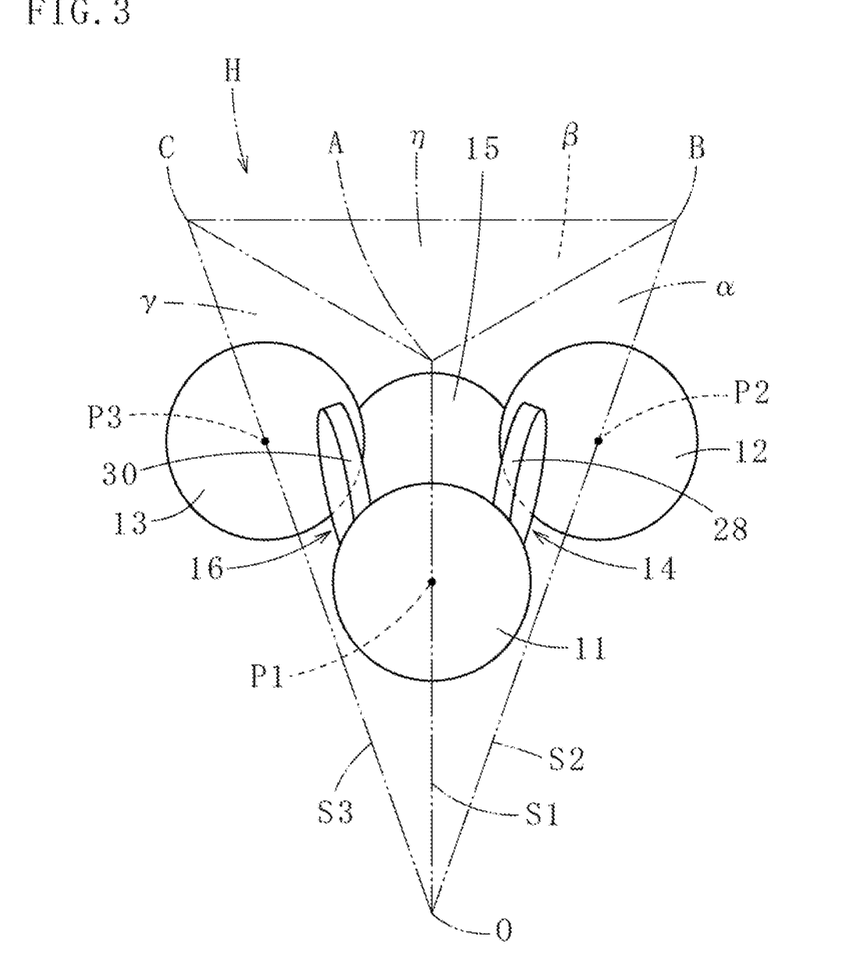
FIG. 3 is a perspective view illustrating the arrangement of the driving spherical bodies and the rotary bodies of the same spherical body drive type movement device.

As shown in FIG. 1, FIG. 2, and FIG. 3, a spherical body drive type movement device 10 according to the first embodiment of the present invention is a device including: three (an example of "n number of"; n is an integer of three or more) driving spherical bodies 11, 12, and 13 each rolling on a traveling surface G; and three (an example of "n or more number of") rotary bodies 14, 15, and 16 rotating the driving spherical bodies 11, 12, and 13 by being rotationally driven in a state of being in contact from two different directions with each of the driving spherical bodies 11, 12, and 13, and the device moving on the traveling surface G. The detailed explanation will be provided below.

In this embodiment, the driving spherical bodies 11, 12, and 13 are, as shown in FIG. 1, FIG. 2, and FIG. 3, true spheres having an identical size (i.e. having an identical diameter). A center P1 of the driving spherical body 11, a center P2 of the driving spherical body 12, and a center P3 of the driving spherical body 13 are located at an identical height when the traveling surface G is a horizontal surface and the driving spherical bodies 11, 12, and 13 are placed on the traveling surface G. Hereinafter, it is assumed that the traveling surface G is a horizontal surface and the driving spherical bodies 11, 12, and 13 are placed on the traveling surface G.

The rotary bodies 14, 15, and 16 are circular-truncated-cone shape parts having an identical size and shape, and disposed at an identical height. The rotary body 14 comes into contact with the driving spherical bodies 11 and 12 via a lateral face 28 at positions of an identical height, the rotary body 15 comes into contact with the driving spherical bodies 12 and 13 via a lateral face 29 at positions of an identical height, and the rotary body 16 comes into contact with the driving spherical bodies 11 and 13 via a lateral face 30 at positions of an identical height. To a shaft center of the rotary body 14, as shown in FIG. 2, a rotary shaft 19 of a motor 18 is connected, to a shaft center of the rotary body 15 a rotary shaft 21 of a motor 20 is connected, and to a shaft center of the rotary body 16 a rotary shaft 23 of a motor 22 is connected. The rotary body 14 is rotationally driven about the rotary shaft 19 upon activation of the motor 18, the rotary body 15 is rotationally driven about the rotary shaft 21 upon activation of the motor 20, and the rotary body 16 is rotationally driven about the rotary shaft 23 upon activation of the motor 22.

The rotary bodies 14 and 15 come into contact from different directions with the driving spherical body 12, the rotary bodies 15 and 16 come into contact from different directions with the driving spherical body 13, and the rotary bodies 14 and 16 come into contact from different directions with the driving spherical body 11.

With the driving spherical body 11, as shown in FIG. 1 and FIG. 2, a ball caster 24 is in contact in addition to the rotary bodies 14 and 16, with the driving spherical body 12 a ball caster 25 is in contact in addition to the rotary bodies 14 and 15, and with the driving spherical body 13 a ball caster 26 is in contact in addition to the rotary bodies 15 and 16.

In this embodiment, the motors 18, 20, and 22 are fixed to a base member 27 (refer to FIG. 1) that supports the ball casters 24, 25, and 26, and the rotary bodies 14, 15, and 16 are rotatably attached to bearing mechanisms attached to the base member 27. In FIG. 1 and FIG. 2, only the balls of the ball casters 24, 25, and 26 are drawn. Incidentally, idlers each coming into contact with one of the driving spherical bodies 11, 12, and 13 may be adopted to prevent the driving spherical bodies 11, 12, and 13 from coming off.

When the contact points at which the driving spherical body 11 comes into contact with the lateral face 28 of the rotary body 14 and with the lateral face 30 of the rotary body 16 are respectively defined as contact points T14 and T16; the contact points at which the driving spherical body 12 comes into contact with the lateral face 28 of the rotary body 14 and with the lateral face 29 of the rotary body 15 are respectively defined as contact points T24 and T25; and the contact points at which the driving spherical body 13 comes into contact with the lateral face 29 of the rotary body 15 and with the lateral face 30 of the rotary body 16 are respectively defined as contact points T35 and T36, the contact points T14, T16, T24, T25, T35, and T36 are disposed at an identical height at positions higher than the center P1 of the driving spherical body 11, the center P2 of the driving spherical body 12, and the center P3 of the driving spherical body 13 (therefore, the lateral face 28 of the rotary body 14, the lateral face 29 of the rotary body 15, and the lateral face 30 of the rotary body 16 come into contact with the driving spherical bodies 11, 12, and 13 at positions of an identical height).

In other words, the rotary body 14 comes into contact with the driving spherical body 11 at a position higher than the center P1 of the driving spherical body 11 and comes into contact with the driving spherical body 12 at a position higher than the center P2 of the driving spherical body 12, the rotary body 15 comes into contact with the driving spherical body 12 at a position higher than the center P2 of the driving spherical body 12 and comes into contact with the driving spherical body 13 at a position higher than the center P3 of the driving spherical body 13, and the rotary body 16 comes into contact with the driving spherical body 11 at a position higher than the center P1 of the driving spherical body 11 and comes into contact with the driving spherical body 13 at a position higher than the center P3 of the driving spherical body 13.

As shown in FIG. 1, FIG. 2, and FIG. 3, when a trigonal pyramid (an example of the n-gonal pyramid) having: a base face r) with a triangular shape (in this embodiment, a regular triangular shape as an example of an equiangular polygon) disposed at a position higher than the center P1 of the driving spherical body 11, the center P2 of the driving spherical body 12, and the center P3 of the driving spherical body 13; and a vertex O being away from the base face η and disposed at a position lower than the center P1 of the driving spherical body 11, the center P2 of the driving spherical body 12, and the center P3 of the driving spherical body 13, is defined as a virtual inverted trigonal pyramid (an example of the virtual inverted n-gonal pyramid) H, in this embodiment, the spherical body drive type movement device 10 is designed to satisfy all of conditions 1 to 6 mentioned below.

In the virtual inverted trigonal pyramid H, three vertices of the base face q are defined as vertices A, B, and C, a triangular lateral face having as its three vertices the vertices O, A, and B is defined as a lateral face α, a triangular lateral face having as its three vertices the vertices O, B, and C is defined as a lateral face β, a triangular lateral face having as its three vertices the vertices O, A, and C is defined as a lateral face γ, a linear edge connecting the vertices O and A is defined as a lateral edge S1, a linear edge connecting the vertices O and B is defined as a lateral edge S2, and a linear edge connecting the vertices O and C is defined as a lateral edge S3. In this embodiment, the base face q is a regular triangle (an example of the equiangular polygon) and the lateral edges S1, S2, and S3 have an identical length. Incidentally, FIG. 2 illustrates the driving spherical bodies 11, 12, and 13, the rotary bodies 14, 15, and 16, and some others viewed from above. In FIG. 3, the motors 18 and 22 and some others are omitted from drawing.

Condition 1: the center P1 of the driving spherical body 11, the center P2 of the driving spherical body 12, and the center P3 of the driving spherical body 13 are located on the lateral edges S1, S2, and S3, respectively.

Condition 2: the rotary body 14 is in contact with the driving spherical bodies 11 and 12 at positions inside the virtual inverted trigonal pyramid H (i.e. the contact points T14 and T24 are located inside the virtual inverted trigonal pyramid H), the rotary body 15 is in contact with the driving spherical bodies 12 and 13 at positions inside the virtual inverted trigonal pyramid H (i.e. the contact points T25 and T35 are located inside the virtual inverted trigonal pyramid H), and the rotary body 16 is in contact with the driving spherical bodies 11 and 13 at positions inside the virtual inverted trigonal pyramid H (i.e. the contact points T16 and T36 are located inside the virtual inverted trigonal pyramid H).

Condition 3: the rotary shaft 19 is perpendicular to the lateral face α (the corresponding lateral face of the rotary body 14) (i.e. the rotary body 14 is rotationally driven about the rotary shaft 19 perpendicular to the lateral face α having as a part of its outer edge the lateral edges S1 and S2 on which the centers P1 and P2 of the driving spherical bodies 11 and 12 in contact with the rotary body 14 are respectively disposed), the rotary shaft 21 is perpendicular to the lateral face β (the corresponding lateral face of the rotary body 15) (i.e. the rotary body 15 is rotationally driven about the rotary shaft 21 perpendicular to the lateral face β having as a part of its outer edge the lateral edges S2 and S3 on which the centers P2 and P3 of the driving spherical bodies 12 and 13 in contact with the rotary body 15 are respectively disposed), and the rotary shaft 23 is perpendicular to the lateral face γ (the corresponding lateral face of the rotary body 16) (i.e. the rotary body 16 is rotationally driven about the rotary shaft 23 perpendicular to the lateral face γ having as a part of its outer edge the lateral edges S1 and S3 on which the centers P1 and P3 of the driving spherical bodies 11 and 13 in contact with the rotary body 16 are respectively disposed).

From condition 3, in this embodiment, it can be said that the rotary shaft 19 of the rotary body 14 in contact with the driving spherical body 11 and the rotary shaft 23 of the rotary body 16 also in contact with the driving spherical body 11 are not parallel, the rotary shaft 19 of the rotary body 14 in contact with the driving spherical body 12 and the rotary shaft 21 of the rotary body 15 also in contact with the driving spherical body 12 are not parallel, and the rotary shaft 21 of the rotary body 15 in contact with the driving spherical body 13 and the rotary shaft 23 of the rotary body 16 also in contact with the driving spherical body 13 are not parallel.

In this embodiment, by arranging the driving spherical bodies 11, 12, and 13, the rotary bodies 14, 15, and 16, and the rotary shafts 19, 21, and 23 so as to satisfy conditions 1, 2, and 3, and adjusting the angular velocity of the rotary bodies 14, 15, and 16, the spherical body drive type movement device 10 is made to be movable in every direction on the traveling surface G while maintaining a state of suppressing a sideslip of the driving spherical bodies 11 and 12 with respect to the rotary body 14, a sideslip of the driving spherical bodies 12 and 13 with respect to the rotary body 15, and a sideslip of the driving spherical bodies 11 and 13 with respect to the rotary body 16. Incidentally, the sideslip of the driving spherical body 11 with respect to the rotary body 14 means that the relative motion of the driving spherical body 11 with respect to the rotary body 14 at the contact point T14 includes other motion than the turning motion centering on the contact point T14, and if the sideslip of the driving spherical body 11 with respect to the rotary body 14 occurs, it encourages wear of the rotary body 14 and the driving spherical body 11.

Besides, the rotary body 14 comes into contact with the driving spherical body 11 at a position higher than the center P1 of the driving spherical body 11 and also with the driving spherical body 12 at a position higher than the center P2 of the driving spherical body 12, the rotary body 15 comes into contact with the driving spherical body 12 at a position higher than the center P2 of the driving spherical body 12 and also with the driving spherical body 13 at a position higher than the center P3 of the driving spherical body 13, and the rotary body 16 comes into contact with the driving spherical body 11 at a position higher than the center P1 of the driving spherical body 11 and also with the driving spherical body 13 at a position higher than the center P3 of the driving spherical body 13. Thus, the force of the vertical component acts on the driving spherical body 11 via the rotary bodies 14 and 16, the force of the vertical component acts on the driving spherical body 12 via the rotary bodies 14 and 15, and the force of the vertical component acts on the driving spherical body 13 via the rotary bodies 15 and 16. Therefore, the spherical body drive type movement device 10 is capable of pushing the rotary body 14 to the driving spherical bodies 11 and 12, pushing the rotary body 15 to the driving spherical bodies 12 and 13, and pushing the rotary body 16 to the driving spherical bodies 11 and 13 by utilizing the self-weight including the weight of, e.g., the base member 27 and heavy goods loaded onto the base member 27, thereby suppressing the idle rotation of the rotary bodies 14, 15, and 16.

In cases where the contact point T14 exists at a position slightly higher in comparison to the center P1 of the driving spherical body 11, and the contact point T24 exists at a position slightly higher in comparison to the center P2 of the driving spherical body 12, the driving spherical bodies 11 and 12 substantially do not sideslip with respect to the rotary body 14 even when the rotary body 14 is in contact with the driving spherical bodies 11 and 12 at positions on the lateral face c (i.e. the corresponding face) of the virtual inverted n-gonal pyramid H, and it is the same in the relationship between the rotary body 15 and the driving spherical bodies 12 and 13, and in the relationship between the rotary body 16 and the driving spherical bodies 11 and 13.

Therefore, the spherical body drive type movement device 10 may be designed to satisfy condition 2' below instead of condition 2.

Condition 2': the rotary body 14 is in contact with the driving spherical bodies 11 and 12 at positions on the lateral face α (the corresponding lateral face of the rotary body 14) of the virtual inverted trigonal pyramid H, the rotary body 15 is in contact with the driving spherical bodies 12 and 13 at positions on the lateral face β (the corresponding lateral face of the rotary body 15) of the virtual inverted trigonal pyramid H, and the rotary body 16 is in contact with the driving spherical bodies 11 and 13 at positions on the lateral face γ (the corresponding lateral face of the rotary body 16) of the virtual inverted trigonal pyramid H.

From a perspective of stably suppressing the occurrence of: the idle rotation of the rotary body 14 with respect to the driving spherical bodies 11 and 12; the idle rotation of the rotary body 15 with respect to the driving spherical bodies 12 and 13; and the idle rotation of the rotary body 16 with respect to the driving spherical bodies 11 and 13, it has been confirmed by verification that it is preferred that any one of conditions 4, 5, and 6 below be satisfied (more preferred to satisfy two of them; further more preferred to satisfy all the three of them) in addition to conditions 1, 2, and 3. Note that it has been confirmed that satisfying conditions 1, 2, and 3 is more important in comparison to satisfying conditions 4, 5, and 6 with regard to the suppression of the idle rotation of the rotary bodies 14, 15, and 16.

Condition 4: a virtual straight line J14 (an example of the virtual straight line J) passing through the contact point T14 of the driving spherical body 11 and the rotary body 14 and also through the center P1 of the driving spherical body 11 orthogonally intersects with the lateral edge S1 on which the center P1 of the driving spherical body 11 is located (refer to FIG. 1), and a virtual straight line J16 (an example of the virtual straight line J) passing through the contact point T16 of the driving spherical body 11 and the rotary body 16 and also through the center P1 of the driving spherical body 11 orthogonally intersects with the lateral edge S1 on which the center P1 of the driving spherical body 11 is located; a virtual straight line J24 (an example of the virtual straight line J) passing through the contact point T24 of the driving spherical body 12 and the rotary body 14 and also through the center P2 of the driving spherical body 12 orthogonally intersects with the lateral edge S2 on which the center P2 of the driving spherical body 12 is located (refer to FIG. 1), and a virtual straight line J25 (an example of the virtual straight line J) passing through the contact point T25 of the driving spherical body 12 and the rotary body 15 and also through the center P2 of the driving spherical body 12 orthogonally intersects with the lateral edge S2 on which the center P2 of the driving spherical body 12 is located; and a virtual straight line J35 (an example of the virtual straight line J) passing through the contact point T35 of the driving spherical body 13 and the rotary body 15 and also through the center P3 of the driving spherical body 13 orthogonally intersects with the lateral edge S3 on which the center P3 of the driving spherical body 13 is located, and a virtual straight line J36 (an example of the virtual straight line J) passing through the contact point T36 of the driving spherical body 13 and the rotary body 16 and also through the center P3 of the driving spherical body 13 orthogonally intersects with the lateral edge S3 on which the center P3 of the driving spherical body 13 is located.

Condition 5: the virtual straight line J14 passing through the contact point T14 of the driving spherical body 11 and rotary body 14 and also through the center P1 of the driving spherical body 11 orthogonally intersects with the lateral face 28 of the rotary body 14, and the virtual straight line J24 passing through the contact point T24 of the driving spherical body 12 and the rotary body 14 and also through the center P2 of the driving spherical body 12 orthogonally intersects with the lateral face 28 of the rotary body 14; the virtual straight line J25 passing through the contact point T25 of the driving spherical body 12 and rotary body 15 and also through the center P2 of the driving spherical body 12 orthogonally intersects with the lateral face 29 of the rotary body 15, and the virtual straight line J35 passing through the contact point T35 of the driving spherical body 13 and the rotary body 15 and also through the center P3 of the driving spherical body 13 orthogonally intersects with the lateral face 29 of the rotary body 15; and the virtual straight line J16 passing through the contact point T16 of the driving spherical body 11 and rotary body 16 and also through the center P1 of the driving spherical body 11 orthogonally intersects with the lateral face 30 of the rotary body 16, and the virtual straight line J36 passing through the contact point T36 of the driving spherical body 13 and the rotary body 16 and also through the center P3 of the driving spherical body 13 orthogonally intersects with the lateral face 30 of the rotary body 16.

Condition 6: the lateral face α, a part of the outer edge of which is composed of two of the lateral edges S1 and S2 on which the centers P1 and P2 of two of the driving spherical bodies 11 and 12 are respectively disposed, of the virtual inverted trigonal pyramid H is parallel to a virtual straight line K12 (an example of a virtual straight line K) passing through the contact point T14 at which the rotary body 14 placed between the two driving spherical bodies 11 and 12 comes into contact with one of the two driving spherical bodies 11, and also through the contact point T24 at which the rotary body 14 comes into contact with the other one of the two driving spherical bodies 12; the lateral face β, a part of the outer edge of which is composed of two of the lateral edges S2 and S3 on which the centers P2 and P3 of two of the driving spherical bodies 12 and 13 are respectively disposed, of the virtual inverted trigonal pyramid H is parallel to a virtual straight line K23 (an example of the virtual straight line K) passing through the contact point T25 at which the rotary body 15 placed between the two driving spherical bodies 12 and 13 comes into contact with one of the two driving spherical bodies 12, and also through the contact point T35 at which the rotary body 15 comes into contact with the other one of the two driving spherical bodies 13; and the lateral face γ, a part of the outer edge of which is composed of two of the lateral edges S1 and S3 on which the centers P1 and P3 of two of the driving spherical bodies 11 and 13 are respectively disposed, of the virtual inverted trigonal pyramid H is parallel to a virtual straight line K13 (an example of the virtual straight line K) passing through the contact point T16 at which the rotary body 16 placed between the two driving spherical bodies 11 and 13 comes into contact with one of the two driving spherical bodies 11, and also through the contact point T36 at which the rotary body 16 comes into contact with the other one of the two driving spherical bodies 13.

Based on the above, the motion of the spherical body drive type movement device 10 will be examined below using numerical formulas.

Figure 4:
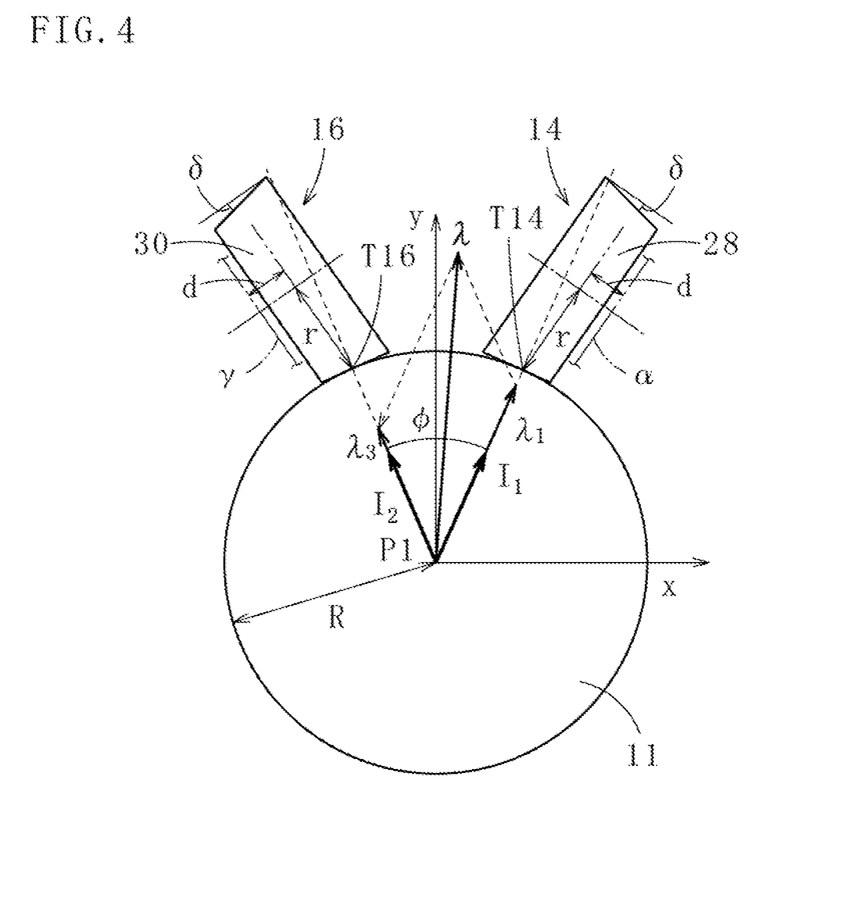
FIG. 4 is an explanatory diagram illustrating a local coordinate system of each of the driving spherical bodies of the same spherical body drive type movement device.

When an angle of the lateral edge S1 with respect to the traveling surface G (that is a horizontal surface) is defined as θ; and, as shown in FIG. 4, a unit position vector from the center P1 of the driving spherical body 11 toward the contact point T14 is defined as $I_1$; a unit position vector from the center P1 of the driving spherical body 11 toward the contact point T16 is defined as $I_2$; and an angle formed by $I_1$ and $I_2$ is defined as φ, equation (1) below is true in this embodiment since $I_1$ orthogonally intersects with a vector having the vertex O as the initial point and the vertex A as the terminal point.

[Math. 1]

$$\overrightarrow{OA} \cdot I_1 = \begin{pmatrix} 0 \\ -1 \\ \tan\theta \end{pmatrix} \cdot \begin{pmatrix} a \\ b \\ c \end{pmatrix} \qquad (1)$$

$$= -b + c\tan\theta = 0$$

Also, equation (2) below is true.

[Math. 2]

$$|I_1|^2 = |I_2|^2 = a^2 + b^2 + c^2 \qquad (2)$$

$$= a^2 + c^2(\tan^2\theta + 1) = 1$$

In addition, when $I_1$ and $I_2$ are expressed as equation (3) below, equation (4) below is true.

[Math. 3]

$$I_1 = (a, b, c)^T, I_2 = (-a, b, c)^T \qquad (3)$$

$$\cos\phi = \frac{I_1 \cdot I_2}{|I_1||I_2|} \qquad (4)$$

$$= -a^2 + b^2 + c^2$$

$$= -a^2 + c^2(\tan^2\theta + 1)$$

From equation (2) and equation (4), equation (5) and equation (6) below are true.

[Math. 4]

$$1 + \cos\phi = 2c^2(\tan^2\theta + 1) \quad (5)$$
$$= 2c^2 \frac{\sin^2\theta + \cos^2\theta}{\cos^2\theta}$$
$$= \frac{2c^2}{\cos^2\theta}$$

$$1 - \cos\phi = 2a^2 \quad (6)$$

Therefore, from equation (1), equation (5), and equation (6), a, b, and c can be expressed respectively as equation (7), equation (8), and equation (9) below.

[Math. 5]

$$a = \frac{\sqrt{1-\cos\phi}}{\sqrt{2}} \quad (7)$$

$$b = \frac{\sin\theta\sqrt{1+\cos\phi}}{\sqrt{2}} \quad (8)$$

$$c = \frac{\cos\theta\sqrt{1+\cos\phi}}{\sqrt{2}} \quad (9)$$

From equation (7), equation (8), and equation (9), $I_1$ and $I_2$ can be expressed respectively as equation (10) and equation (11) below.

[Math. 6]

$$I_1 = \begin{pmatrix} I_x \\ I_y \\ I_z \end{pmatrix} = \frac{1}{\sqrt{2}} \begin{pmatrix} \sqrt{1-\cos\phi} \\ \sin\theta\sqrt{1+\cos\phi} \\ \cos\theta\sqrt{1+\cos\phi} \end{pmatrix} \quad (10)$$

$$I_2 = \begin{pmatrix} -I_x \\ I_y \\ I_z \end{pmatrix} \quad (11)$$

Also, since $I_x$ and $I_y$ have a relationship shown in equation (12) below, equation (13) below is true.

[Math. 7]

$$\sqrt{3} I_x = I_y \quad (12)$$

$$\cos\phi = \frac{3-\sin^2\theta}{3+\sin^2\theta} \quad (13)$$

Since $\sin\phi$ is expressed as equation (14) below, $I_x$ and $I_y$ can be expressed respectively by equation (15) and equation (16) below.

[Math. 8]

$$\sin\phi = \sin\left(\arccos\frac{3-\sin^2\theta}{3+\sin^2\theta}\right) \quad (14)$$

$$= \sqrt{1 - \left(\frac{3-\sin^2\theta}{3+\sin^2\theta}\right)^2}$$
$$= \frac{\sqrt{12\sin^2\theta}}{3+\sin^2\theta}$$
$$= \frac{2\sqrt{3}\sin\theta}{3+\sin^2\theta}$$

$$I_x = \frac{\sqrt{1-\cos\phi}}{\sqrt{2}} = \frac{\sqrt{1-\frac{3-\sin^2\theta}{3+\sin^2\theta}}}{\sqrt{2}} \quad (15)$$
$$= \frac{\sin\theta}{\sqrt{3+\sin^2\theta}}$$

$$I_y = \frac{\sin\theta\sqrt{1+\cos\phi}}{\sqrt{2}} \quad (16)$$
$$= \frac{\sin\theta\sqrt{1+\frac{3-\sin^2\theta}{3+\sin^2\theta}}}{\sqrt{2}} = \frac{\sin\theta\sqrt{\frac{6}{3+\sin^2\theta}}}{\sqrt{2}}$$
$$= \frac{\sin\theta\sqrt{3}}{\sqrt{3+\sin^2\theta}}$$

Figure 5:
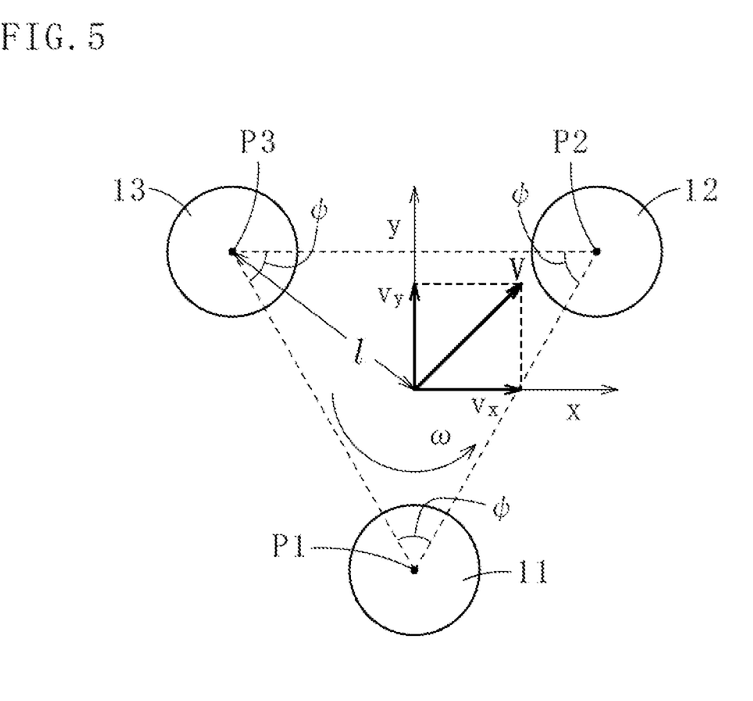
FIG. 5 is an explanatory diagram illustrating a coordinate system of the driving spherical bodies of the same spherical body drive type movement device.

Here, as shown in FIG. 5, when two orthogonally intersecting virtual axes that are parallel to the traveling surface G are defined as an x-axis and a y-axis; distances from a center of a regular triangle having as its vertices the center P1 of the driving spherical body 11, the center P2 of the driving spherical body 12, and the center P3 of the driving spherical body 13, to the center P1 of the driving spherical body 11, to the center P2 of the driving spherical body 12, and to the center P3 of the driving spherical body 13 are each defined as l; distances from the contact point T14 (contact point T24) to the shaft center of the rotary body 14, from the contact point T25 (contact point T35) to the shaft center of the rotary body 15, and from the contact point T16 (contact point T36) of the rotary body 16 to the shaft center of the rotary body 16 are each defined as r (refer to FIG. 4); a velocity vector of the spherical body drive type movement device 10 is defined as V; and an angular velocity vector supplied from the rotary bodies 14, 15, and 16 to the whole of the driving spherical bodies 11, 12, and 13 is defined as λ, V and λ have a relationship shown in equation (17) below.

[Math. 9]

$$\lambda = QV$$

$$V = Q^{-1}\lambda \quad (17)$$

Also, when the velocity in the x-axis direction of the spherical body drive type device 10 is defined as $v_x$; the velocity in the y-axis direction of the spherical body drive type device 10 is defined as $v_y$; and the turning velocity of the spherical body drive type movement device 10 is defined as ω, the velocity vector V of the spherical body drive type movement device 10 is expressed as $V=(v_x, v_y, \omega)^T$.

When the angular velocity transmitted from the rotary body 14 to the driving spherical bodies 11 and 12 is defined as $\lambda_1$; the angular velocity transmitted from the rotary body 15 to the driving spherical bodies 12 and 13 is defined as $\lambda_2$; and the angular velocity transmitted from the rotary body 16 to the driving spherical bodies 11 and 13 is defined as $\lambda_3$, the angular velocity vector λ is expressed as $\lambda=(\lambda_1, \lambda_2, \lambda_3)^T$.

In addition, Q in equation (17) is expressed by equation (18) below.

[Math. 10]

$$Q = \frac{\sin\phi}{2rl_y}\begin{pmatrix} 1 & \sqrt{3} & l \\ -2 & 0 & l \\ 1 & -\sqrt{3} & l \end{pmatrix} \quad (18)$$

Therefore, $Q^{-1}$ is expressed by equation (19) below.

[Math. 11]

$$Q^{-1} = \frac{rl_y}{3\sin\phi}\begin{pmatrix} 1 & -2 & 1 \\ \sqrt{3} & 0 & -\sqrt{3} \\ 2/l & 2/l & 2/l \end{pmatrix} \quad (19)$$

Here, when $k=l_y/\sin\varphi$ is true, k can be expressed by equation (20) below.

[Math. 12]

$$k = \frac{l_y}{\sin\phi} = \frac{\frac{\sin\theta\sqrt{3}}{\sqrt{3+\sin^2\theta}}}{\frac{2\sqrt{3}\sin\theta}{3+\sin^2\theta}} \quad (20)$$

$$= \frac{3+\sin^2\theta}{2\sqrt{3+\sin^2\theta}}$$

$$= \frac{\sqrt{3+\sin^2\theta}}{2}$$

Also, as shown in FIG. 4 and FIG. 5, when the radii of the driving spherical bodies 11, 12, and 13 are each defined as R; an angle formed by a straight line connecting the center P1 of the driving spherical body 11 and the center P2 of the driving spherical body 12 and a straight line connecting the center P1 of the driving spherical body 11 and the center P3 of the driving spherical body 13, an angle formed by a straight line connecting the center P1 of the driving spherical body 11 and the center P2 of the driving spherical body 12 and a straight line connecting the center P2 of the driving spherical body 12 and the center P3 of the driving spherical body 13, and an angle formed by a straight line connecting the center P1 of the driving spherical body 11 and the center P3 of the driving spherical body 13 and a straight line connecting the center P2 of the driving spherical body 12 and the center P3 of the driving spherical body 13, are each defined as ψ; a distance from a straight line connecting the contact point T14 and the contact point T24 to the lateral face α, a distance from a straight line connecting the contact point T25 and the contact point T35 to the lateral face β, and a distance from a straight line connecting the contact point T16 and the contact point T36 to the lateral face γ are each define as d; and an angle of the lateral face 28 with respect to the shaft center of the rotary body 14, an angle of the lateral face 29 with respect to the shaft center of the rotary body 15, and an angle of the lateral face 30 with respect to the shaft center of the rotary body 16 are each defined as δ, equation (21), equation (22), and equation (23) below are true.

[Math. 13]

$$\delta = \frac{\psi - \phi}{2} \quad (21)$$

$$d = R\sin\delta \quad (22)$$

$$r = r + R(1 - \cos\delta) \quad (23)$$

The above examination has been made about the cases where the three driving spherical bodies 11, 12, and 13 have an identical size, and the triangle having as its vertices the center P1 of the driving spherical body 11, the center P2 of the driving spherical body 12, and the center P3 of the driving spherical body 13, has a regular triangular shape. However, even in cases where the driving spherical bodies each have a different size (diameter), and the three edges of the triangle having as its vertices each center of the three driving spherical bodies each have a different length, the same result is obtained. Also, even when the number of the driving spherical bodies is four or more, the same result is obtained. However, in the cases where all the driving spherical bodies have an identical size, and a polygon having as its vertices the center of each driving spherical body is an equiangular polygon, the calculation for determining the rotational frequency of each motor appropriately in order to move the spherical body drive type movement device toward a desired direction is easy, and in the cases where the polygon is a regular polygon, the calculation becomes easier in comparison to the cases where the polygon is an equiangular polygon but is not a regular polygon. Incidentally, as long as each driving spherical body has an identical size, the polygon having the center of each driving spherical body as its vertices and the base face of the virtual inverted n-gonal pyramid become identical in shape and different in size.

Although the spherical body drive type movement device 10 heretofore explained has the three driving spherical bodies 11, 12, and 13, the number of the driving spherical bodies may be four or more, or may be two.

In cases where the number of the driving spherical bodies is q (q≥4), the arrangement of the driving spherical bodies and the rotary bodies is determined based on a virtual inverted q-gonal pyramid (i.e. an upside-down polygonal pyramid), and the number of the rotary bodies coming into contact with each driving spherical body becomes two.

In cases where the number of the driving spherical bodies is two, a driven rotator (e.g. a spherical body, or a roller with a rotary shaft that can be freely changed in direction) or a plurality of driven rotators rolling on the traveling surface is/are provided, and the spherical body drive type movement device travels in a state where the two driving spherical bodies and the one or more driven rotators are in contact with the traveling surface.

A spherical body drive type movement device 40 including two driving spherical bodies 11 and 12 and a driven spherical body (an example of the driven rotator) 43 will be subsequently explained with reference to FIG. 6. To the components of the spherical body drive type movement device 40 that are identical to the components of the spherical body drive type movement device 10, the identical reference signs will be given and such components will be omitted from the detailed explanation.

Figure 6:
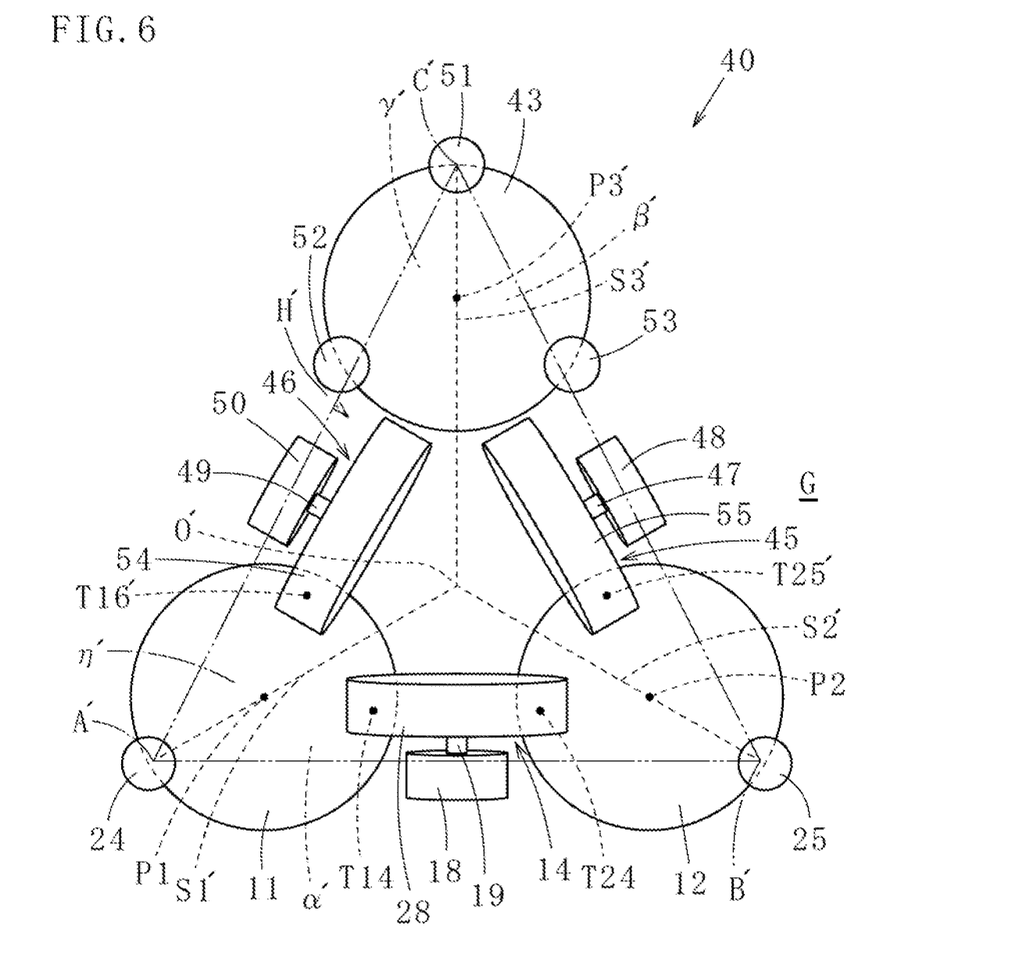
FIG. 6 is an explanatory diagram of a spherical body drive type movement device according to a second embodiment of the present invention.

The spherical body drive type movement device 40 according to the second embodiment of the present invention is, as shown in FIG. 6, a device including: two driving spherical bodies 11 and 12 each rolling on a traveling surface G; a driven spherical body 43 rolling on the traveling surface G; and three (an example of "m number of"; m is an integer of three or more) rotary bodies 14, 45, and 46 rotating the driving spherical bodies 11 and 12 by being rotationally driven in a state of being in contact from two different directions with each of the driving spherical bodies 11 and 12, and the device moving on the traveling surface G.

The rotary body 14 is rotationally driven about a rotary shaft 19 of a motor 18 upon activation of the motor 18. The rotary body 45 is rotationally driven about a rotary shaft 47 upon activation of a motor 48, the rotary shaft 47 of which is connected to a shaft center of the rotary body 45. The rotary body 46 is rotationally driven about a rotary shaft 49 upon activation of the motor 50, the rotary shaft 49 of which is connected to a shaft center of the rotary body 46.

The rotary bodies 14 and 46 are in contact from different directions with the driving spherical body 11, and the rotary bodies 14 and 45 are in contact from different directions with the driving spherical body 12. The driven spherical body 43 is held in a predetermined position by bringing ball casters 51, 52, and 53 into contact with the driven spherical body 43. Incidentally, in FIG. 6, only the balls of the ball casters 24, 25, 51, 52, and 53 are drawn.

When the contact points at which the driving spherical body 11 comes into contact with a lateral face 28 of the rotary body 14 and with a lateral face 54 of the rotary body 46 are respectively defined as contact points T14 and T16', and the contact points at which the driving spherical body 12 comes into contact with the lateral face 28 of the rotary body 14 and with a lateral face 55 of the rotary body 45 are respectively defined as contact points T24 and T25', the contact points T14, T16', T24, and T25' are disposed at an identical height at positions higher than a center P1 of the driving spherical body 11 and a center P2 of the driving spherical body 12 (in addition to them, also higher than a center P3' of the driven spherical body 43, in this embodiment).

Therefore, the rotary body 14 comes into contact with the driving spherical body 11 at a position higher than the center P1 of the driving spherical body 11 and comes into contact with the driving spherical body 12 at a position higher than the center P2 of the driving spherical body 12, the rotary body 45 comes into contact with the driving spherical body 12 at a position higher than the center P2 of the driving spherical body 12, and the rotary body 46 comes into contact with the driving spherical body 11 at a position higher than the center P1 of the driving spherical body 11.

When a trigonal pyramid having a base face η' with a triangular shape (in this embodiment, an isosceles triangle) disposed at a position higher than the center P1 of the driving spherical body 11, the center P2 of the driving spherical body 12, and the center P3' of the driven spherical body 43, and also having a vertex O' being away from the base face η' and disposed at a position lower than the center P1 of the driving spherical body 11, the center P2 of the driving spherical body 12, and the center P3' of the driven spherical body 43, is defined as a virtual inverted trigonal pyramid H'; three vertices of the base face η' are defined as vertices A', B', and C'; a triangular lateral face having as its three vertices the vertices O', A', and B' is defined as a lateral face α' (an example of the virtual inclined plane passing the center P1 of the driving spherical body 11 and the center P2 of the driving spherical body 12); a triangular lateral face having as its three vertices the vertices O', B', and C' is defined as a lateral face β'; a lateral face having as its three vertices the vertices O', A', and C' is defined as a lateral face γ'; a linear edge connecting the vertices O' and A' is defined as a lateral edge S1'; a linear edge connecting the vertices O' and B' is defined as a lateral edge S2'; and a linear edge connecting the vertices O' and C' is defined as a lateral edge S3', the spherical body drive type movement device 40 is designed to satisfy all of conditions 7 to 9 mentioned below.

Condition 7: the center P1 of the driving spherical body 11, the center P2 of the driving spherical body 12, and the center P3' of the driven spherical body 43 are located on the lateral edges S1', S1', and S3', respectively.

Condition 8: the rotary body 14 is in contact with the driving spherical bodies 11 and 12 at positions inside the virtual inverted trigonal pyramid H' (i.e. on the driven spherical body 43 side with reference to the lateral face α' that is an example of the virtual inclined plane), the rotary body 45 is in contact with the driving spherical body 12 at a position inside the virtual inverted trigonal pyramid H', and the rotary body 46 is in contact with the driving spherical body 11 at a position inside the virtual inverted trigonal pyramid H'.

Condition 9: the rotary shaft 19 is perpendicular to the lateral face α', the rotary shaft 47 is perpendicular to the lateral face β', and the rotary shaft 49 is perpendicular to the lateral face γ'.

In cases where the contact point T14 exists at a position slightly higher in comparison to the center P1 of the driving spherical body 11, and the contact point T24 exists at a position slightly higher in comparison to the center P2 of the driving spherical body 12, the spherical body drive type movement device 40 may be adapted to satisfy condition 8' below instead of condition 8.

Condition 8': the rotary body 14 is in contact with the driving spherical bodies 11 and 12 at positions on the lateral face α' of the virtual inverted trigonal pyramid H', the rotary body 45 is in contact with the driving spherical body 12 at a position on the lateral face β' of the virtual inverted trigonal pyramid H', and the rotary body 46 is in contact with the driving spherical body 11 at a position on the lateral face γ' of the virtual inverted trigonal pyramid H'.

Also, from condition 9, the rotary shaft 19 of the rotary body 14 in contact with the driving spherical body 11 and the rotary shaft 49 of the rotary body 46 in contact with the driving spherical body 11 are not parallel, and the rotary shaft 19 of the rotary body 14 in contact with the driving spherical body 12 and the rotary shaft 47 of the rotary body 45 in contact with the driving spherical body 12 are not parallel. Also, by adjusting the angular velocity of the rotary bodies 14, 45, and 46, the spherical body drive type movement device 40 is made to be movable in every direction on the traveling surface G while maintaining a state of suppressing the sideslip of the driving spherical bodies 11 and 12 with respect to the rotary body 14, the sideslip of the driving spherical body 12 with respect to the rotary body 45, and the sideslip of the driving spherical body 11 with respect to the rotary body 46.

As well as in the case of the spherical body drive type movement device 10, the rotary bodies 14, 45, and 46 in the spherical body drive type movement device 40 are each in a circular-truncated-cone shape. A virtual straight line passing through the contact point T14 of the driving spherical body 11 and the lateral face 28 of the rotary body 14 and also through the center P1 of the driving spherical body 11 orthogonally intersects with the lateral face 28 of the rotary body 14, a virtual straight line passing through the contact point T24 of the driving spherical body 12 and the lateral face 28 of the rotary body 14 and also through the center P2 of the driving spherical body 12 orthogonally intersects with the lateral face 28 of the rotary body 14, a virtual straight line passing through the contact point T16' of the driving spherical body 11 and the lateral face 54 of the rotary body 46 and also through the center P1 of the driving spherical body 11 orthogonally intersects with the lateral face 54 of the rotary body 46, and a virtual straight line passing through the contact point T25' of the driving spherical body 12 and the lateral face 55 of the rotary body 45 and also through the center P2 of the driving spherical body 12 orthogonally intersects with the lateral face 55 of the rotary body 45. Also, the positional relationship among the driving spherical bodies 11 and 12 and the rotary bodies 14, 45, and 46 in the spherical body drive type movement device 40 is the same as the positional relationship among the driving spherical bodies 11 and 12 and the rotary bodies 14, 15, and 16 in the spherical body drive type movement device 10.

The embodiments of the present invention have been described heretofore. However, the present invention is not limited to the above-described configurations, and any changes to the conditions or the like that do not deviate from the gist are within the scope of application of the present invention.

For example, two rotary bodies, over which a power transmitting belt or the like is stretched, may be rotationally driven by using one motor and be brought into contact respectively with one of and the other one of the adjacent driving spherical bodies. Alternatively, two different rotary bodies may be brought into contact respectively with the adjacent driving spherical bodies, and a motor may be connected to each of the two rotary bodies.

With regard to a spherical body drive type movement device including: two driving spherical bodies each rolling on a traveling surface; a driven rotator rolling on the traveling surface; and r number (r is an integer of three or more) of rotary bodies rotating the driving spherical bodies by being rotationally driven in a state of being in contact from two different directions with each of the driving spherical bodies, and the spherical body drive type movement device moving on the traveling surface, in cases where two of the rotary bodies, over which a power transmitting belt or the like is stretched, are rotationally driven by using one motor and are brought into contact respectively with one of and the other one of the adjacent driving spherical bodies, it is only required that each rotary body is brought into contact with one of the driving spherical bodies at a position higher than the center of the driving spherical body in contact, and that the two rotary bodies out of the r number of rotary bodies, which receive the driving rotational force from the common motor, are brought into contact with the driving spherical bodies at positions on the driven rotator side with reference to a virtual inclined plane passing the center of each driving spherical body or at positions on the virtual inclined plane, and besides, the two rotary bodies are each rotationally driven about a rotary shaft perpendicular to the virtual inclined plane. In these cases, the positional relationship among the driving spherical bodies and the rotary bodies is the same as the relationship among the driving spherical bodies 11 and 12 and the rotary bodies 14, 15, and 16 in the spherical body drive type movement device 10 and also as the relationship among the driving spherical bodies 11 and 12 and the rotary bodies 14, 45, and 46 in the spherical body drive type movement device 40.

Also, each rotary body does not need to be in a circular-truncated-cone shape, but may be in, e.g., a circular-cylinder shape or a spherical shape.

Additionally, the rotary shaft of each rotary body may be a shaft material (i.e. a real material) or a virtual shaft.

Furthermore, what support the driving spherical bodies are not limited to the ball casters, but free-roller type wheels such as swivel casters and omni-wheels may be adopted instead of the ball casters.

Also, each driving spherical body may have a different size, and each rotary body may have a different size and/or a different shape. Additionally, each rotary body may be arranged such that the height at which each rotary body comes into contact with the driving spherical body differs in a state where each driving spherical body is placed on a horizontal surface.

Moreover, the present invention is also applicable to a spherical body drive type movement device whose moving direction on a traveling surface is fixed (e.g. a spherical body drive type movement device capable of moving forward and backward only).

INDUSTRIAL APPLICABILITY

Since the spherical body drive type movement device according to the present invention travels while maintaining the state where the idle rotation of the rotary bodies in contact with the driving spherical bodies is suppressed, the spherical body drive type movement device stably moves along a desired route, thereby being able to be applied to a wheelchair and an unattended carrying vehicle.

REFERENCE SIGNS LIST

10: spherical body drive type movement device, 11, 12, 13: driving spherical body, 14, 15, 16: rotary body, 18: motor, 19: rotary shaft, 20: motor, 21: rotary shaft, 22: motor, 23: rotary shaft, 24, 25, 26: ball caster, 27: base member, 28, 29, 30: lateral face, 40: spherical body drive type movement device, 43: driven spherical body, 45, 46: rotary body, 47: rotary shaft, 48: motor, 49: rotary shaft, 50: motor, 51, 52, 53: ball caster, 54, 55: lateral face, A, B, C, A', B', C': vertex, G: traveling surface, H, H': virtual inverted trigonal pyramid, J14, J16, J24, J25, J35, J36: virtual straight line, K12, K13, K23: virtual straight line, O, O': vertex, P1, P2, P3, P3': center, S1, S2, S3, S1', S2', S3': lateral edge, T14, T16, T24, T25, T35, T36, T16', T25': contact point, α, β, γ, α', β', γ': lateral face, η, η': base face

The invention claimed is:

1. A spherical body drive type movement device comprising:
n number of driving spherical bodies each rolling on a traveling surface; and
n or more number of rotary bodies rotating the driving spherical bodies by being rotationally driven in a state of being in contact from two different directions with each of the driving spherical bodies,
the spherical body drive type movement device moving on the traveling surface,
wherein when the traveling surface is a horizontal surface, a center of each of the driving spherical bodies is located on one of lateral edges of a virtual inverted n-gonal pyramid having a base face disposed at a position higher than the center of each of the driving spherical bodies and also having a vertex being away from the base face and disposed at a position lower than the center of each of the driving spherical bodies, further wherein each of the rotary bodies comes into contact with at least one of the driving spherical bodies at a position or positions higher than the center of the at least one of the driving spherical bodies in contact and inside the virtual inverted n-gonal pyramid, or at a position or positions higher than the center of the at least one of the driving spherical bodies in contact and when lateral faces of the virtual inverted n-gonal pyramid each including as a part of an outer edge thereof two of the lateral edges on each of which the center of one of the driving spherical bodies is disposed are defined as corresponding lateral faces, on one of the corresponding lateral faces, and besides, each of the rotary bodies is rotationally driven about a rotary shaft perpendicular to the one of the corresponding lateral faces;

provided, however, that n is an integer of three or more, wherein each of the lateral faces, a part of the outer edge of which is composed of two of the lateral edges on which the centers of two of the driving spherical bodies are respectively disposed, of the virtual inverted n-gonal pyramid is parallel to a virtual straight line K passing through a contact point at which one of the rotary bodies placed between the two of the driving spherical bodies comes into contact with one of the two driving spherical bodies, and also through another contact point at which the one of the rotary bodies comes into contact with the other one of the two driving spherical bodies.

2. The spherical body drive type movement device set forth in claim 1, wherein virtual straight lines J each passing through a contact point at which one of the driving spherical bodies comes into contact with one of the rotary bodies and also through the center of the one of the driving spherical bodies, orthogonally intersects with one of the lateral edges on which the center of the one of the driving spherical bodies is located.

3. The spherical body drive type movement device set forth in claim 1, wherein each of the rotary bodies has a circular-truncated-cone shape, a lateral face of each of the rotary bodies comes into contact with the at least one of the driving spherical bodies, and virtual straight lines J each passing through a contact point at which one of the driving spherical bodies comes into contact with the lateral face of one of the rotary bodies and also through the center of the one of the driving spherical bodies, orthogonally intersects with the lateral face of the one of the rotary bodies.

4. The spherical body drive type movement device set forth in claim 1, wherein the base face of the virtual inverted n-gonal pyramid is an equiangular polygon.

5. The spherical body drive type movement device set forth in claim 2, wherein the base face of the virtual inverted n-gonal pyramid is an equiangular polygon.

6. The spherical body drive type movement device set forth in claim 3, wherein the base face of the virtual inverted n-gonal pyramid is an equiangular polygon.

7. The spherical body drive type movement device set forth in claim 1, wherein each of the driving spherical bodies has an identical size, each of the rotary bodies has an identical size circular-truncated-cone shape, and the lateral face of each of the rotary bodies comes into contact with the at least one of the driving spherical bodies at an identical height.

8. The spherical body drive type movement device set forth in claim 2, wherein each of the driving spherical bodies has an identical size, each of the rotary bodies has an identical size circular-truncated-cone shape, and the lateral face of each of the rotary bodies comes into contact with the at least one of the driving spherical bodies at an identical height.

9. The spherical body drive type movement device set forth in claim 3, wherein each of the driving spherical bodies has an identical size, each of the rotary bodies has an identical size circular-truncated-cone shape, and the lateral face of each of the rotary bodies comes into contact with the at least one of the driving spherical bodies at an identical height.

10. The spherical body drive type movement device set forth in claim 2, wherein each of the driving spherical bodies has an identical size, each of the rotary bodies has an identical size circular-truncated-cone shape, and the lateral face of each of the rotary bodies comes into contact with the at least one of the driving spherical bodies at an identical height.

* * * * *